United States Patent [19]

Sullivan

[11] 4,269,946
[45] May 26, 1981

[54] LOW DENSITY HIGH RESILIENCY FOAMS

[75] Inventor: Carl M. Sullivan, Cuyahoga Falls, Ohio

[73] Assignee: The Goodyear Tire & Rubber Company, Akron, Ohio

[21] Appl. No.: 117,406

[22] Filed: Jan. 31, 1980

[51] Int. Cl.³ .......................................... C08G 18/14
[52] U.S. Cl. ..................................... 521/163; 521/176
[58] Field of Search ................................ 521/163, 176

[56] References Cited

U.S. PATENT DOCUMENTS 3,789,027  1/1974  Traübel et al. ...................... 521/163
4,136,241  1/1979  Ammann .............................. 521/163

FOREIGN PATENT DOCUMENTS 1352628  5/1974  United Kingdom .

Primary Examiner—Maurice J. Welsh
Attorney, Agent, or Firm—J. D. Wolfe

[57] ABSTRACT

A process for producing flexible polyurethane foams having improved load bearing properties which process includes the step of reaction of a polyisocyanate with a polymeric polyol in the presence of a catalyst, a blowing agent and a chain extender consisting of 1,2-diaminocyclohexane.

5 Claims, No Drawings

LOW DENSITY HIGH RESILIENCY FOAMS

TECHNICAL FIELD

This invention relates to an improved foam. More particularly this invention relates to low density high resiliency foam, sometimes designated as LED foam.

BACKGROUND OF THE INVENTION

High resiliency foams (HR) have been known and manufactured for a number of years. These foams may be made by reacting a polyol, preferably a polyether polyol, with an organic polyisocyanate in the presence of a catalyst, a blowing agent such as water or the volatile halo carbons, and a crosslinking agent. As the density of the HR foams is reduced the load carrying ability of the foam at between a density of 2 and 2.2 becomes unacceptable or only marginally acceptable as measured by a specification such as Fisher Body's.

THE INVENTION

It has been discovered that improved flexible polyurethane foam can be produced using 1,2-diaminocyclohexane as the crosslinker to enhance the load bearing characteristics. For example, a mixture, preferably made by the one step method of mixing a polyol of 1000 to 7000 molecular weight, an organic polyisocyanate, blowing agent, catalyst and 1,2-diaminocyclohexane in crosslinking amounts and allowing the mixture to foam gives a foam having improved load bearing characteristics relative to an identical mixture containing an equivalent amount of isophorone diamine.

The polymeric polyol preferably has a number average molecular weight of 1000 or more and desirably below 7000 and possibly 8000. I have found a number average molecular weight range of 3000 to 6000 to be a particularly convenient range to employ. The polymeric polyol is conveniently a polyalkylene ether polyol, e.g. triol or diol or mixture thereof. Polyether polyols of this type can be obtained by reaction of an alkylene oxide e.g. ethylene oxide, propylene oxide, trimethylene oxide or butylene oxide or a mixture of two or more thereof with a polyhydric alcohol such as ethylene glycol, propylene glycol, dipropylene glycol, tetramethylene glycol, glycerol, trimethylolpropane or a mixture of two or more thereof. Polymeric polyols of this type derived from propylene oxide or a mixture of propylene oxide with ethylene oxide either contain only secondary hydroxyl groups or a mixture of secondary and primary hydroxyl groups. By reacting these polyols with ethylene oxide one can obtain modified polyols having a high content of primary hydroxyl groups. These modified polyols are described as "capped" or "tipped" polyether polyols and may with advantage be used in the process according to the invention.

Alternatively the polymeric polyol may be obtained by polymerizing a cyclic ether such as tetrahydrofuran.

The polyol may have a hydroxyl number of from 25 to 100.

The preferred organic polyisocyanates are tolylene diisocyanate, methane-diphenyl isocyanate and the phosgenated product of a rearranged reaction product of aniline and its homologues with an aldehyde, commonly referred to as polyarylene polyisocyanates where the arylene radical is phenyl preferably separated by a methylene or ethylene radical.

The density of the foam may be varied using different proportions of a blowing agent. Partly by reason of commercial considerations, water is the most convenient blowing agent to employ. Water offers an additional advantage as a blowing agent in that it not only undergoes an in situ reaction with the isocyanate component to produce carbon dioxide but also results in urea linkages which serve as crosslinking sites. Other blowing agents which may be employed include methylene chloride and fluorocarbons. Water may be used in conjunction with nonaqueous blowing agents such as methylene chloride and fluorocarbons to produce foams of lower density.

Catalyst systems employed may be of the usual type such as, for example, tertiary amine catalysts, e.g., 1,4-diazobicyclo-2,2,2-octane, which catalyze the water-isocyanate reaction as well as the polyol-isocyanate reaction, N,N-dimethylethanolamine which preferentially catalyzes the water-isocyanate reaction rather than the polyol-isocyanate reaction and the usual organo-tin catalysts such as, for example, dibutyl tin dilaurate and stannous salts, e.g., stannous octoate. Other materials which may conveniently be employed in the product of polyurethane foams according to the invention include stabilizers, pigments, fillers, flame retardants and extenders.

Stabilizers, for example, sulphonated castor oil and silicones, e.g. polydimethylsiloxanes may be added to improve the miscibility of the components. However, care should be taken when using silicones of the polyoxyalkylene ether-polydimethylsiloxane block copolymer type to avoid the production of closed cell foams or collapsed foams, i.e., foams having inter alia low sag factors. When manufacturing molded foams it may be advantageous to include a relatively minor amount of a polydimethylsiloxane surfactant or a silicone of the above described block copolymer type to modify the surface cell structure of the product. If it is desired to formulate a polyurethane foam exhibiting flame retardant characteristics then, as explained above, it is generally advisable to omit silicones of the block copolymer type or to only use such materials in relatively minor amounts. Optimum amounts of such materials to be used for the particular effect desired may readily be determined by a simple trial run.

The polyurethane foams according to the invention may be made by prepolymer, semiprepolymer and one-shot foam techniques. Such techniques are well known to those skilled in the art and can be varied depending on the type of product desired.

BEST MODE OF CARRYING OUF THE INVENTION

The invention will be illustrated further with respect to the following specific examples, which are given by way of illustration and not given as limitations on the scope of this invention.

EXAMPLES

These examples specifically illustrate the invention with LED Foams with recipes being given in Table I and the foams being produced on standard one shot foam machines and physical properties are shown in Table II on the cured molded foam.

TABLE I

| Formula # Run | Formulations | | | |
|---|---|---|---|---|
| | Control | 1 | 2 | 3 |
| Polyol A | 80.0 | 80.0 | 80.0 | 80.0 |

TABLE I-continued

| Formula # Run | Control | 1 | 2 | 3 |
|---|---|---|---|---|
| Polyol B | 20.0 | | | |
| Polyol C | | 20.0 | 20.0 | 20.0 |
| Isophorone diamine | 1.0 | | | |
| 1,2-diaminocyclohexane | | 1.0 | 1.0 | 0.5 |
| DABCO33LB | 1.0 | 1.0 | 0.5 | 0.8 |
| Niax A-107 | 0.5 | 0.5 | 0.5 | 0.5 |
| F-11-630 | 0.03 | 0.03 | 0.03 | 0.03 |
| Q2-5043 | 0.8 | 0.80 | 0.80 | 0.80 |
| Water | 3.3 | 3.05 | 3.3 | 4.1 |
| 90/10 TDI/PAPI | 1.04 | index → | | |
| 80/20 TDI/PAPI | 1.04 | index | → | → |

TABLE II
Physical Properties Of 1,2 Dach Stabilized Foam

| Sample Run # | Control | 1 | 3 | 3 |
|---|---|---|---|---|
| Density (lb/ft³) | 2.0 | 2.0 | 1.76 | 1.53 |
| Tensile, psi Original | 19.3 | 22.3 | 22.0 | 23.9 |
| Aged | 23.8 | 18.7 | 18.0 | 20.9 |
| Elongation % Original | 200 | 207 | 195 | 197 |
| Aged | 267 | 212 | 190 | 192 |
| Tears (ppi) | 1.7 | 1.8 | 1.94 | 1.7 |
| **ILD lbs/50 in² | | | | |
| 25% | 15 | 18 | 13 | 14 |
| 65% | 45 | 51 | 40 | 43 |
| 25% R | 13 | 14 | 10 | 11 |
| Compression Set 75% | 14.5 | 12.2 | 14.5 | 18 |
| Humid aging Comp Set 50% | | | | |
| @ 70° C./22 hrs. | — | 25 | 39.7 | 35 |
| Air Flow | 3.8 | 2.7 | — | — |

**Indentation load deflextion

TABLE III

| Formula Ingredients | Description |
|---|---|
| Polyol A | 4800 mol wt ethylene oxide capped polypropylene oxide polyol (triol) |
| Polyol B | 6300 mol wt EO/PO polyol partially grafted with 20% by wt styrene and acrylonitrile copolymer |
| Polyol C | 4800 mol wt EO/PO polyol filled with 20% by wt with polyurea formed from TDI and Hydrazine |
| Dabco 33LV | 33% triethylenediamine |
| Niax A-107 | Bis(2-dimethylaminoethyl) ether/formic acid |
| Fomrez UL-1 | Mercapto-tin catalyst |
| F-1-1630 | 5 centistokes silicone oil |
| Q2-5043 | Silicone/polyether copolymer developed for HR foam |
| TDI | Toluene diisocyanate |
| PAPI | Polymeric diphenyl methane diisocyanate |

While certain representative embodiments and details have been shown for the purpose of illustrating the invention it will be apparent to those skilled in this art that various changes and modifications may be made therein without departing from the spirit or scope of the invention.

I claim:

1. A process for producing a flexible polyurethane foam having improved load bearing characteristics for its density by effecting reaction between (a) a polyisocyanate and (b) a polymeric polyol which is a polyalkylene ether having a number average molecular weight in the range of 1000 to 7000 in the presence of (c) a catalyst and (d) a blowing agent, and 1,2-diaminocyclohexane.

2. A process of claim 1 wherein said 1,2-diaminocyclohexane is present in 0.5 to 2.0 parts per 100 of polyol.

3. A process of claim 1 wherein the polymeric polyol has a number average molecular weight of 4500 to 6000 and is a diol, triol or mixture thereof.

4. A process of claim 3 wherein the polymeric polyol is obtained by reaction of a polyhydric alcohol with (a) propylene oxide or (b) a mixture of propylene oxide and ethylene oxide or (c) propylene oxide followed by ethylene oxide.

5. A polyurethane foam having a density of 1.5 to 2.2 lb/ft³.

* * * * *